United States Patent
Woo et al.

(10) Patent No.: US 12,106,420 B2
(45) Date of Patent: Oct. 1, 2024

(54) GRAPHICS PROCESSING UNIT AND OPERATING METHOD THEREOF

(71) Applicant: SAMSUNG ELECTRONICS CO., LTD., Suwon-si (KR)

(72) Inventors: Sangoak Woo, Anyang-si (KR); Jeongae Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 247 days.

(21) Appl. No.: 17/691,202

(22) Filed: Mar. 10, 2022

(65) Prior Publication Data

US 2022/0309732 A1  Sep. 29, 2022

(30) Foreign Application Priority Data

Mar. 26, 2021  (KR) .................. 10-2021-0039940

(51) Int. Cl.
| | |
|---|---|
| *G06T 15/04* | (2011.01) |
| *G06T 1/60* | (2006.01) |
| *G06T 9/00* | (2006.01) |
| *G06T 15/00* | (2011.01) |

(52) U.S. Cl.
CPC .............. *G06T 15/04* (2013.01); *G06T 1/60* (2013.01); *G06T 9/00* (2013.01); *G06T 15/005* (2013.01)

(58) Field of Classification Search
CPC .. G06T 15/04; G06T 1/60; G06T 9/00; G06T 15/005
See application file for complete search history.

(56) References Cited

U.S. PATENT DOCUMENTS

| | | | |
|---|---|---|---|
| 9,378,560 B2 | 6/2016 | Iourcha et al. | |
| 10,181,176 B2 | 1/2019 | Abraham et al. | |
| 10,535,178 B2 | 1/2020 | Mirza et al. | |
| 10,699,361 B2 | 6/2020 | Mammou | |
| 10,719,447 B2 | 7/2020 | Akenine-Moller et al. | |
| 10,726,519 B2* | 7/2020 | Fielding | G06F 12/0875 |
| 2007/0070078 A1* | 3/2007 | Schilling | G06T 15/04 |
| | | | 345/582 |
| 2011/0292065 A1* | 12/2011 | Minkin | G06T 15/04 |
| | | | 345/582 |
| 2016/0140688 A1* | 5/2016 | Lee | G06T 9/00 |
| | | | 345/426 |
| 2017/0154443 A1* | 6/2017 | Maksymczuk | G06T 11/001 |
| 2017/0221256 A1* | 8/2017 | Maksymczuk | G06T 9/00 |
| 2017/0256025 A1* | 9/2017 | Abraham | H04N 19/426 |
| 2019/0096027 A1* | 3/2019 | Fielding | G06F 12/0811 |
| 2020/0210343 A1 | 7/2020 | Tomei et al. | |
| 2022/0309732 A1* | 9/2022 | Woo | G06T 15/005 |

* cited by examiner

*Primary Examiner* — Abderrahim Merouan
(74) *Attorney, Agent, or Firm* — F. Chau & Associates, LLC (57) ABSTRACT

An operating method of a graphics processing unit includes: receiving a first read request for texels, detecting whether decompression data associated with each of the texels are present in a first cache, decompressing part of a first texture compression block associated with a first texel among the texels when a result of the detecting indicates decompression data for the first texel is not present in the first cache, to generate first decompression data, and generating first texture data corresponding to the first read request, based on the first decompression data and second decompression present in the first cache.

20 Claims, 9 Drawing Sheets

GRAPHICS PROCESSING UNIT AND OPERATING METHOD THEREOF

CROSS-REFERENCE TO RELATED APPLICATIONS

This U.S. non-provisional patent application claims priority under 35 U.S.C. § 119 to Korean Patent Application No. 10-2021-0039940 filed on Mar. 26, 2021, in the Korean Intellectual Property Office, the disclosure of which is incorporated by reference in its entirety herein.

1. Technical Field

Embodiments of the present disclosure described herein relate to a graphics processing unit and an operating method thereof, and more particularly, relate to a graphics processing unit including a texture processing unit and an operating method thereof.

2. Discussion of Related Art

Three-dimensional graphics application program interface (API) standards include OpenGL, OpenGL ES, and Direct 3. The API standards include a way to perform rendering on each frame of a three-dimensional graphics and to display an image. The rendering of each frame of the three-dimensional graphics requires many computations, thereby causing increased power consumption.

A texture image that is used to determine a color of a pixel in performing rendering may be compressed and stored in a texture cache in compliance with various compression formats such as adaptive scalable texture compression (ASTC). Accordingly, texture images may need to be decompressed when rendering is performed. As a compression ratio of a texture image increases, an algorithm for performing the compression may become more complicated, thereby causing increased power consumption.

SUMMARY

At least one embodiment of the present disclosure provide a graphics processing unit including a cache storing decompressed texture data and a decompressor decompressing at least part of a texture compression block, and an operating method thereof.

According to an embodiment of the present disclosure, a graphics processing unit includes a first cache, a second cache, a controller, and a decompressor. The first cache is configured to store texture compression blocks respectively corresponding to texels. The second cache is configured to store texel data decompressed from the first cache. The controller is configured to receive a first read request for first texels of the texels and determine whether decompressed texel data corresponding to the first texels are present in the second cache. The decompressor is configured to decompress the texture compression blocks stored in the first cache under control of the controller. In response to determining that decompressed texel data corresponding to second texels of the first texels are not present in the second cache, the decompressor decompresses a part corresponding to the second texels from a texture compression block corresponding to the second texels from among the texture compression blocks.

According to an embodiment of the present disclosure, an operating method of a graphics processing unit includes: receiving a first read request for texels, detecting whether decompression data associated with each of the texels are present in a first cache, decompressing part of a first texture compression block associated with a first texel among the texels when a result of the detecting indicates decompression data for the first texel is not present in the first cache, to generate first decompression data, and generating first texture data corresponding to the first read request, based on first decompression data and second decompression data detected to be present in the first cache.

According to an embodiment of the present disclosure, a device includes a processor, and a memory that stores instructions executable by the processor. The instructions, when executed, cause the processor to in response to a first request, detect whether decompression data of texels associated with the first request are present in a first cache, decompress part of a first texture compression block associated with a first texel among the texels when a result of the detect indicates decompression data for the first texel is not present in the first cache, to generate first decompression data, and generate first texture data corresponding to the first request, based on first decompression data and second decompression data detected to be present in the first cache.

BRIEF DESCRIPTION OF THE FIGURES

The present disclosure will become apparent by describing in detail embodiments thereof with reference to the accompanying drawings.

DETAILED DESCRIPTION OF THE EMBODIMENTS

Below, embodiments of the present disclosure will be described in detail and clearly to such an extent that one skilled in the art may implement the present disclosure.

Hereinafter, embodiments of the present disclosure will be described in more detail with reference to accompanying drawings. In describing the present disclosure, to make the overall understanding clear, like components/elements will be marked by like reference signs/numerals in the drawings, and thus, additional description will be omitted to avoid redundancy.

Figure 1:
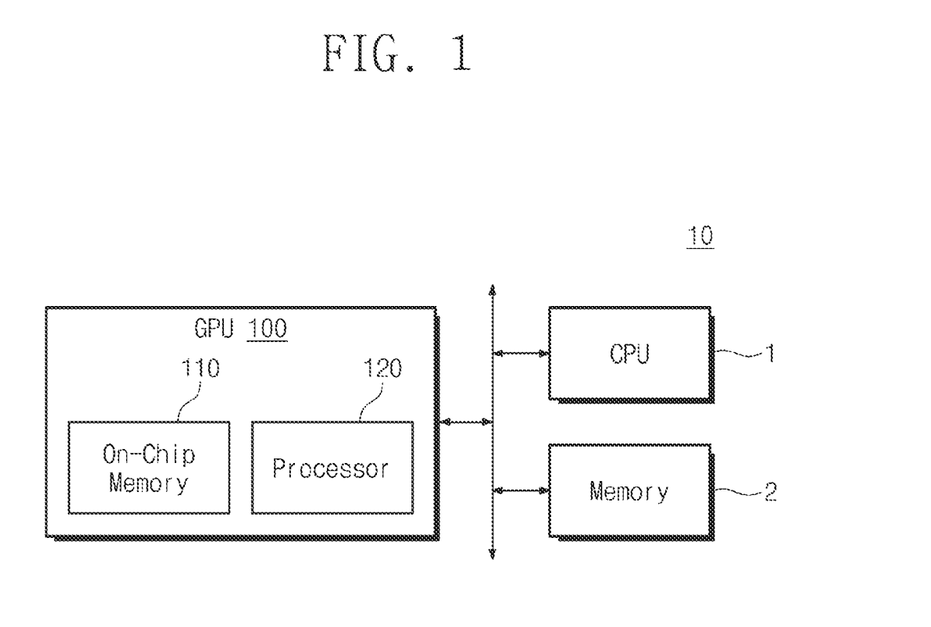
FIG. 1 illustrates a block diagram of a computing system according to an embodiment of the present disclosure.

FIG. 1 illustrates a block diagram of a computing system 10 according to an embodiment of the present disclosure. Referring to FIG. 1, the computing system 10 includes a central processing unit (CPU) 1, an external memory 2, and a graphics processing unit (GPU) 100.

The CPU 1 may perform various operations necessary for the computing system 10 to operate. The CPU 1 may load software, firmware, or a program code stored in the external memory 2. The CPU 1 may store results of the operations in the external memory 2 or may transmit the results to the GPU 100. The CPU 1 may request the GPU 100 to process graphics data. For example, the CPU 1 can offload some or all of the graphics data it would otherwise process to the GPU 100 for processing.

The external memory 2 may store data or information necessary for the CPU 1 or the GPU 100 to process data. The external memory 2 may store data processed by the CPU 1 and the GPU 100. The external memory 2 may store software, firmware, a program code, or instructions that are executable by the CPU 1 or the GPU 100. The external memory 2 may include a static random access memory (SRAM) or a dynamic random access memory (DRAM).

The GPU 100 may perform various operations associated with graphics processing by using data transmitted from the CPU 1 and data stored in the external memory 2. The GPU 100 may include an on-chip memory 110 and a processor 120.

The on-chip memory 110 may store data that are used frequently by the processor 120 or are to be used presently by the processor 120. The on-chip memory 110 may include various program codes or instructions executable by the processor 120, data that the processor 120 intends to process, or data processed by the processor 120. The on-chip memory 110 may include a DRAM or an SRAM.

The processor 120 may perform various operations for processing a graphics present in the external memory 2 or the on-chip memory 110. For example, the processor 120 may process (or generate) the graphics by executing program codes or instructions present in the external memory 2 or the on-chip memory 110 or compiled codes provided from the CPU 1.

Figure 2:
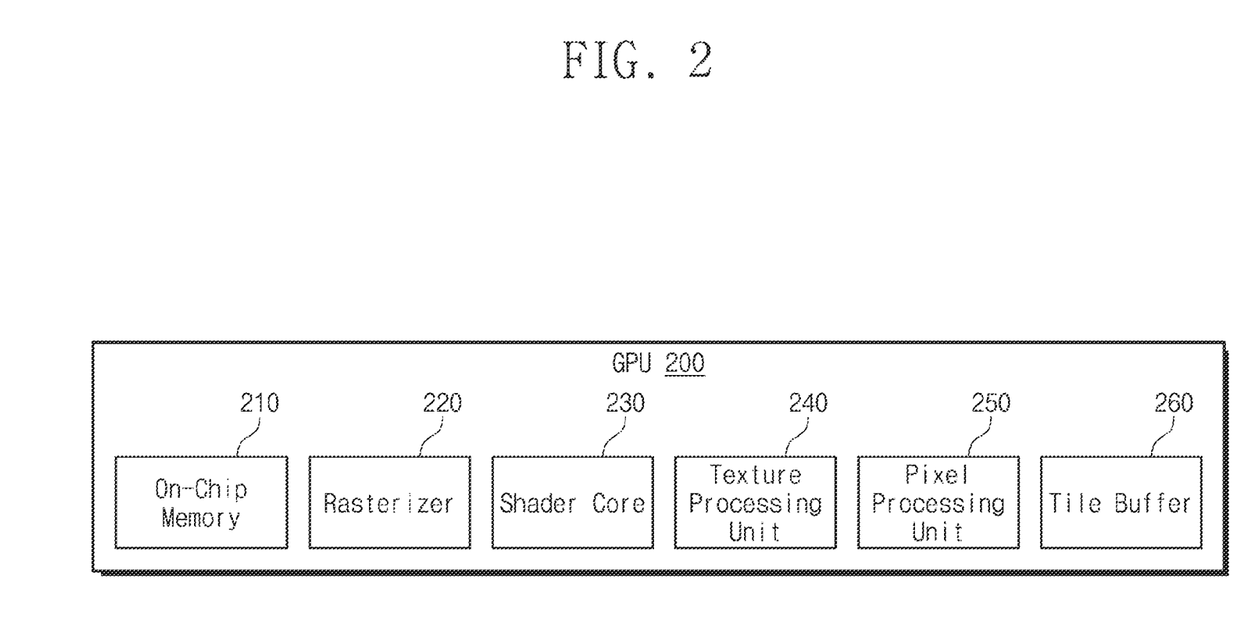
FIG. 2 illustrates a block diagram of a graphics processing unit in detail, according to an embodiment of the present disclosure.

FIG. 2 illustrates a block diagram of a GPU 200 in detail, according to an embodiment of the present disclosure. Referring to FIG. 2, the GPU 200 includes an on-chip memory 210, a rasterizer 220, a shader core 230, a texture processing unit 240, a pixel processing unit 250, and a tile buffer 260. In some embodiments, the processor 120 of FIG. 1 may include the rasterizer 220, the shader core 230, the texture processing unit 240, and the pixel processing unit 250 or may perform operations to be performed respectively by the components 220 to 250. In an embodiment, each of the components 220 to 250 is implemented by a respective a processor.

In an embodiment, the GPU 200 of FIG. 2 is configured to process a three-dimensional graphics by using tile based rendering (TBR). For example, the GPU 200 may perform the following operations to generate a three-dimensional (3D) graphics corresponding to one frame: 1) rasterize a plurality of tiles segmented by a given size, 2) perform pixel shading, 3) perform texture processing, and 4) process pixels corresponding to processed tiles. For example, the 3D graphics or image data may be divided into a plurality of tiles of the given size. The rasterize may include performing a rasterization that converts a given one of the tiles into a raster image. The 3D graphics may be in a vector graphics format. The raster image may include a series of pixels, dots, or lines. For example, the pixel shading may be performed on first pixels of the raster image to generate second pixels, the texture processing may be performed on the second pixels to generate third pixels, and then the third pixels from may be processed to generate a processed tile. That is, a plurality of tiles may be processed through the rasterizer 220, the shader core 230, and the pixel processing unit 250, and the processed tiles may be stored in the tile buffer 260. The GPU 200 may process all tiles constituting one frame in parallel by using a plurality of channels each composed of the rasterizer 220, the shader core 230, the texture processing unit 240, and the pixel processing unit 250. When a plurality of tiles corresponding to one frame are processed, the GPU 200 may transmit processing results stored in the tile buffer 260 to a frame buffer (not illustrated) present in the external memory 2. The GPU 200 may store a result, which is frequently used or which is to be used next, from among the processing results in the on-chip memory 210 (or may store data associated with the result therein).

The shader core 230 may include a pixel shader. In an embodiment, the pixel shader combines constant variables, texture data, interpolated per-vertex values, and other data to produce per-pixel outputs. The shader core 230 may further include a vertex shader or may be implemented with an integrated shader where the pixel shader and the vertex shader are integrated. In an embodiment, the vertex shader is a programmable stage in a rendering pipeline that handles the processing of individual vertices. In an embodiment where the shader core 230 performs a function of the vertex shader, the shader core 230 may generate a primitive indicating an object that is to be transferred to the rasterizer 220.

The rasterizer 220 may perform rasterization on a primitive generated from the vertex shader through a geometric transformation process.

The shader core 230 may receive the rasterized primitive from the rasterizer 220. The shader core 230 may perform pixel shading on the rasterized primitive. For example, to determine colors of all pixels constituting a tile, the shader core 230 may perform pixel shading on tiles including a fragment of the primitive generated through the rasterization. To generate a three-dimensional graphics being stereoscopic and realistic in the pixel shading process, the shader core 230 may use a pixel value generated by using a texture.

The shader core 230 may request a pixel value corresponding to a desired pixel from the texture processing unit 240. In response to the request of the shader core 230, the texture processing unit 240 may provide the shader core 230 with a pixel value generated by processing a texture prepared (or stored) in advance. A texture may be stored in an internal space (e.g., a texture cache 242 of FIG. 4) of the texture processing unit 240, an external space of the texture processing unit 240, the on-chip memory 210, or an external memory of the GPU 200 (e.g., the external memory 2 of FIG. 1). In an embodiment where a texture to be used to generate the pixel value requested from the shader core 230 is absent from the texture processing unit 240, the texture processing unit 240 may fetch the texture from the external space (e.g., the on-chip memory 210) of the texture processing unit 240 or the external memory 2 and may use the fetched texture. If the texture is present in the internal space, the texture is not considered absent, and thus need not be fetched.

The pixel processing unit 250 may perform a depth test on pixels corresponding to the same location in one tile and may determine a pixel value to be finally displayed in a display device (not illustrated). In an embodiment, the depth test is used to check visibility at the fragment (pixel) level, and if multiple pixels are on the same line of sight, the color of the pixel closest to the camera will override all the other pixels. As in the above description, the pixel processing unit 250 may determine all pixel values corresponding to one tile. The pixel processing unit 250 may transmit the determined pixel values to the tile buffer 260.

The tile buffer 260 may store all the pixel values corresponding to one tile received from the pixel processing unit 250. When graphics processing associated with all tiles constituting one frame is completed, a processing result that is stored in the tile buffer 260 may be transmitted to the frame buffer of the external memory 2.

Figure 3:
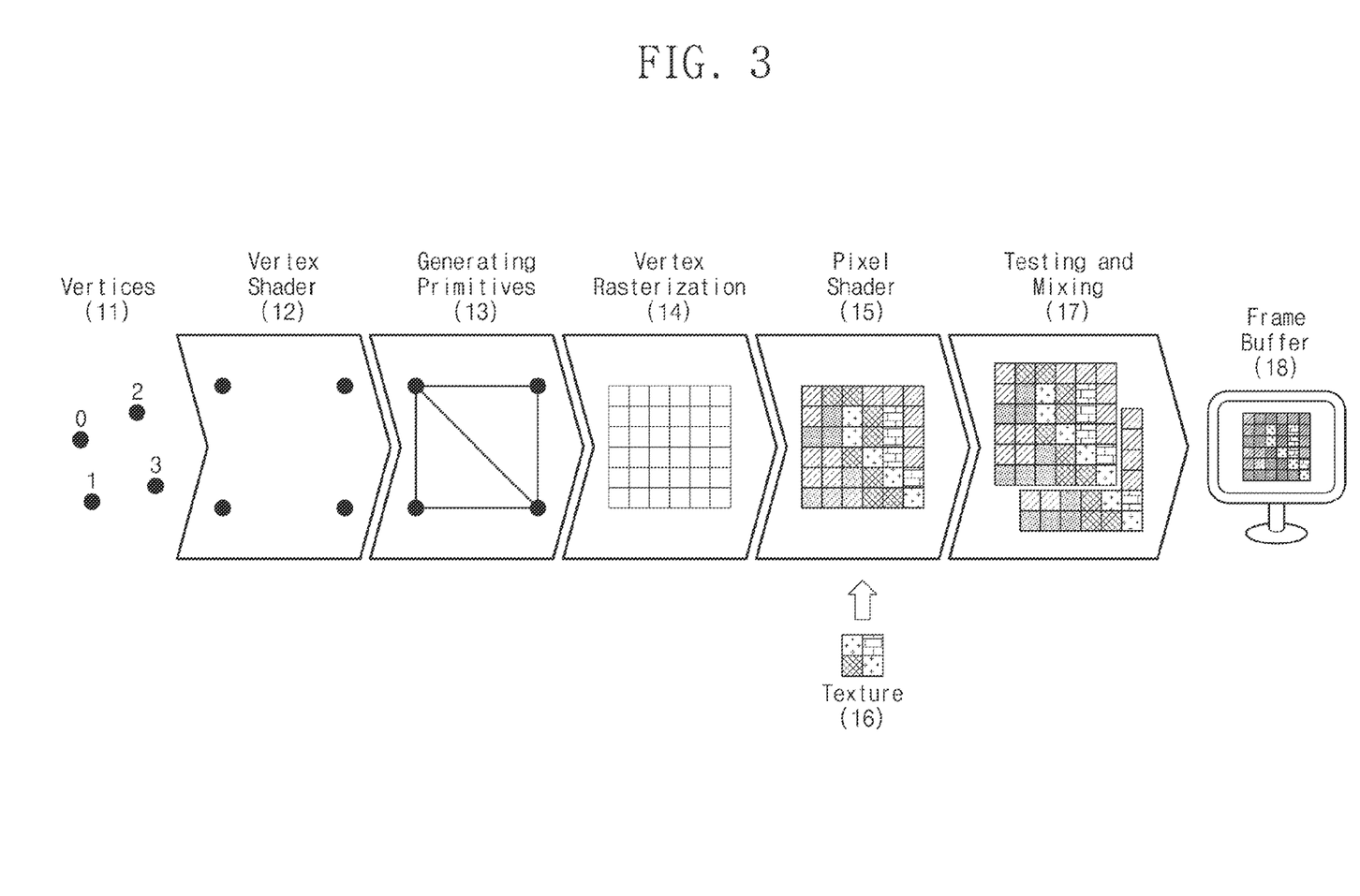
FIG. 3 is a flowchart illustrating a process in which a graphics processing unit processes a three-dimensional graphics, according to an embodiment of the present disclosure.

FIG. 3 is a flowchart illustrating a process in which a graphics processing unit processes a three-dimensional graphics, according to an embodiment of the present disclosure. The process of processing a three-dimensional graphics may be divided into three phases: 1) geometric transformation, 2) rasterization, and 3) pixel shading. The three phases will be described in more detail with reference to FIG. 3. Referring to FIG. 3, a three-dimensional (3D) graphics may be processed by the GPU 200 of FIG. 2 through operation 11 to operation 18.

In operation 11, vertices associated with an image are generated. The vertices are generated to indicate objects included in a 3D graphics of an image. The vertices may be points in 3D space having 3D coordinates such as x, y, and z coordinates.

In operation 12, the generated vertices are shaded. A vertex shader may perform shading on the vertices by specifying locations (e.g., three-dimensional locations or three-dimensional coordinates) of the vertices generated in operation 11.

In operation 13, primitives are generated based on the generated vertices or the generated vertices that were shaded. A primitive may mean a point, a line, a polygon, etc. formed by using at least one of a plurality of vertices. For example, the primitive may be a triangle that is formed by connecting at least three vertices. For example, a triangle may be formed by connecting at least three of the vertices that were shaded.

In operation 14, the primitives are rasterized. To rasterize a primitive may mean to divide primitives into fragments. A fragment may be a basic unit for performing graphics processing on a primitive. Since a primitive includes only information about a vertex or a collection of related vertices (e.g., connected to form a certain polygon or line), processing for the 3D graphics may be possible by generating a fragment between a vertex and a vertex in the rasterization process. In an embodiment, rasterizing a primitive means to convert a primitive into pixels.

In operation 15, at least one pixel is shaded based on a result (e.g., generated fragments) of the rasterization. Fragments that are generated by the rasterization and constitute a primitive may include one or more of pixels of a tile. The terms "fragment" and "pixel" may be interchangeably used in some cases. For example, a pixel shader may be referred to as a "fragment shader". In general, a basic unit of graphics processing associated with a primitive may be referred to as a "fragment", and afterwards, a basic unit of graphics processing associated with pixel shading may be referred to as a "pixel". A color of a pixel may be determined in the pixel shading process.

In operation 16, texturing for determining a color of a pixel is performed. Texturing refers to a process of determining a color of a pixel by using an image prepared in advance, that is, a texture. To express the appearance of various colors and patterns in the real world, calculating and determining a color of each pixel causes a considerable increase in both the amount of data computation required for graphics processing and a graphics processing time. For this reason, the color of the pixel may be determined by using a texture prepared in advance. For example, a surface color of an object may be stored in advance as a separate two-dimensional (2D) image being a texture. Afterwards, the color of the pixel may be determined by expanding or reducing the stored texture depending on a location and a size of an object on the screen or by mixing texel values by using textures having various resolutions.

For example, pixel values that are generated by using a previously prepared (or desired) texture can be used to process the 3D graphics more quickly in the pixel shading process. In an embodiment, to adaptively cope with a size of a 3D object, a plurality of textures having different resolutions are prepared in advance and may be combined to generate a pixel value. In this embodiment, textures that are prepared in advance and have different resolutions may be referred to as a "mipmap". For example, to generate pixel values of an object having an intermediate resolution of two mipmaps prepared in advance, texel values of a location corresponding to the object may be extracted from the two mipmaps and may then be filtered. As such, pixel values constituting the object may be generated. In an embodiment, a texel (e.g., a texture element) is a fundamental unit of a texture map. A texture or texture image may be represented by an array of texels. A texel may be a pixel within a texture image. In an embodiment, a texel represents a smallest graphical element in 2D texture mapping to "wallpaper" the rendering of a 3D object to create the impression of a textured surface.

In operation 17, testing and mixing are performed. Pixel values corresponding to one tile may be determined by determining pixel values to be finally displayed through a process of performing a depth test on pixels corresponding to the same location in the tile. A plurality of tiles generated through the above process may be mixed to generate a 3D graphics corresponding to one frame.

In operation 18, the frame generated through operation 11 to operation 17 is stored in the frame buffer. A frame stored in the frame buffer may be displayed through a display device.

Referring again to FIGS. 1 and 2, a texture (or a texture image) may be stored in the external memory 2 of FIG. 1 in the form of compression (e.g., in a compressed form), or a frame generated by the GPU 200 may be stored in the frame buffer present in the external memory 2. The external memory 2 may store a frame, which is generated as a rendering result of the GPU 200, in the frame buffer of the external memory 2. The external memory 2 may store a frame generated as a rendering result of the GPU 200 in the frame buffer of the external memory 2. The external memory 2 may transmit a texture (or a compressed texture) to the texture processing unit 240 in response to a request of the texture processing unit 240.

However, it may be physically impossible to store all textures for various objects and mipmaps respectively corresponding to the textures in a given space of the texture processing unit 240. In rendering for the 3D graphics, to minimize a space necessary to store textures and to efficiently transmit a texture, textures may be generally stored or transmitted in the form of compression. One texture may be divided into a plurality of texture blocks having the same size (or including an equal number of texels), and each of the texture blocks may be compressed to an equal number of bits.

Figure 4:
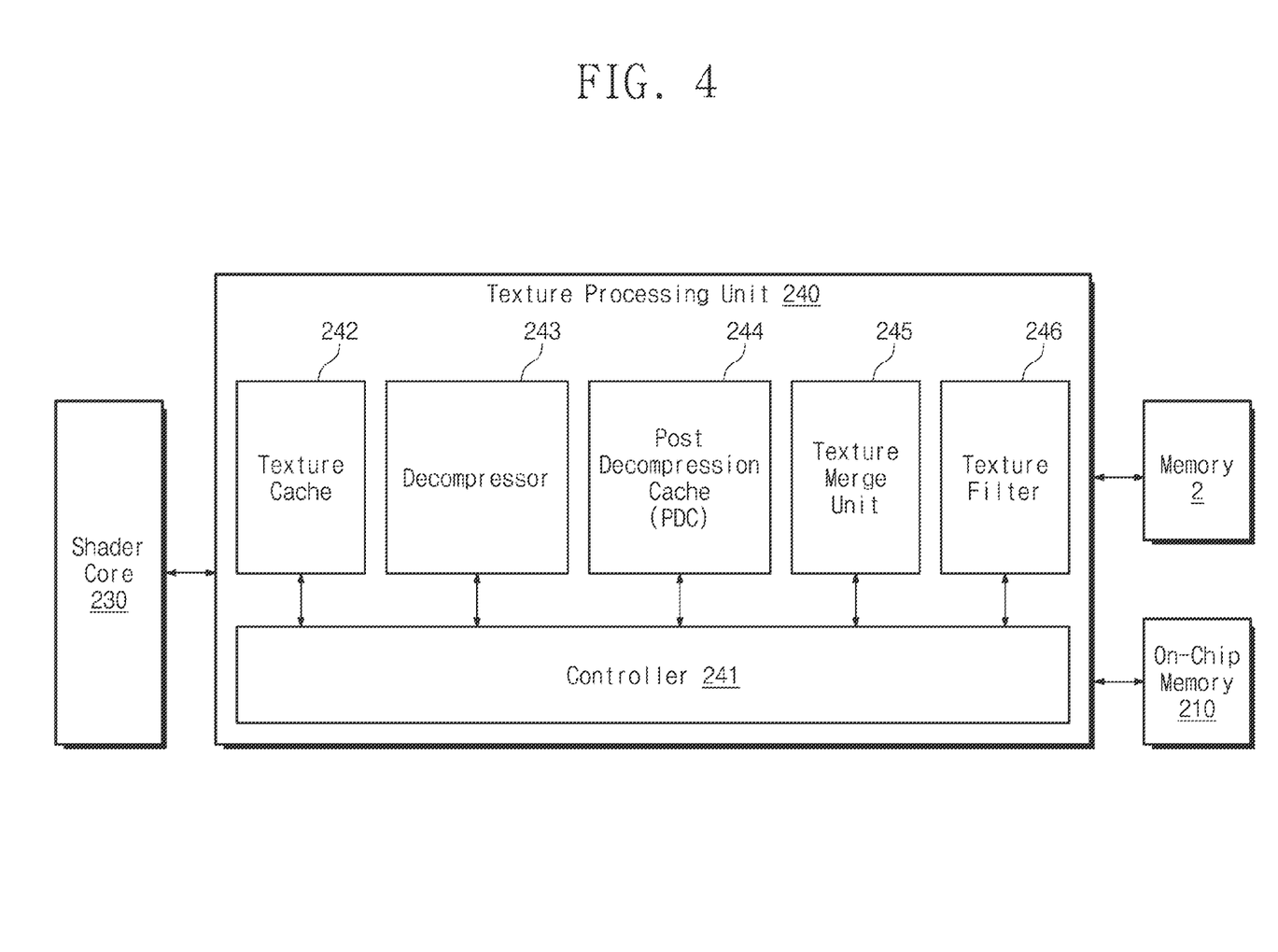
FIG. 4 illustrates a block diagram of a texture processing unit in detail, according to an embodiment of the present disclosure.

FIG. 4 illustrates a block diagram of the texture processing unit 240 in detail, according to an embodiment of the present disclosure. Referring to FIG. 4, the texture processing unit 240 includes a controller 241 (e.g., a control circuit), the texture cache 242, a decompressor 243 (e.g., a logic circuit), a post decompression cache (PDC) 444, a texture merge unit 245 (e.g., a logic circuit), and a texture filter 246 (e.g., a logic circuit).

The controller 241 may control operations of the components of the texture processing unit 240. For example, the controller 241 may perform various operations that are used to control the texture processing unit 240 or may transmit control signals to the remaining components of the texture processing unit 240.

The controller 241 may receive a request (or a read request) for texture processing from the shader core 230. For example, the shader core 230 may request a value of at least one texel corresponding to at least one pixel (e.g., at least one quad (i.e., a group of four pixels)) from the texture processing unit 240. For example, the request for texture processing may include texture image information indicating a texture block in which texels corresponding to pixels to be processed by the shader core 230 are included (or information indicating a level of a mipmap texture in which texels corresponding to pixels to be processed by the shader core 230 are included), and location (or coordinate) information of the texels on the texture block. In response to the request of the shader core 230, the controller 241 may read data present in the texture cache 242 or the PDC 244 and may generate signals for controlling the decompressor 243, the texture merge unit 245, and the texture filter 246.

The controller 241 may determine whether it needs to decompress data necessary for texture processing, based on the information provided from the shader core 230. For example, the controller 241 may determine whether data of texels requested by the shader core 230 (e.g., decompressed values corresponding to the texels requested by the shader core 230) are present in the PDC 244. The controller 241 may calculate one or more addresses corresponding to the data of the texels requested by the shader core 230, based on the information provided from the shader core 230. The controller 241 may compare the calculated addresses with addresses corresponding to data previously stored in the PDC 244.

When at least one of the calculated addresses matches with at least one of the addresses of the data previously stored in the PDC 244, at least part of the data of the texels requested by the shader core 230 may be determined as being present in the PDC 244 (i.e., may be determined as a cache hit). The controller 241 may read at least part of data of texels corresponding to the calculated addresses from the PDC 244.

When the calculated addresses do not match with the addresses of the data previously stored in the PDC 244, at least part of the data of the texels requested by the shader core 230 may be determined as being absent from the PDC 244.

The controller 241 may determine that there is a need to decompress texels determined as data thereof when they are absent from the PDC 244. The controller 241 may calculate an address and a tag(s) of a texture compression block(s) corresponding to the texels targeted for decompression, based on the information provided from the shader core 230. The controller 241 may determine whether a texture compression block(s) corresponding to texel data absent from the PDC 244 is present in the texture cache 242, based on the calculated tag. For example, the controller 241 may search the texture cache 242 for the calculated tag(s). In an embodiment, the tag is stored data including information identifying a given texture compression block and indicating whether the given texture compression block corresponds to texel data absent from the PDC 244 but present in the texture cache 242.

When the calculated tag(s) is present in the texture cache 242, at least part of the texture compression block(s) may be determined as being present in the texture cache 242 (i.e., may be determined as a cache hit), and the controller 241 may read the at least part of the texture compression block(s) corresponding to the tag(s) from the texture cache 242.

When the calculated tag(s) is absent from the texture cache 242, at least part of the texture compression block(s) may be determined as being absent from the texture cache 242 (i.e., may be determined as a cache miss), and the controller 241 may read the texture compression block(s), which is absent from the texture cache 242, from the on-chip memory 210 or the external memory 2 based on the address and may store the texture compression block(s) in the texture cache 242 together with the tag(s). The controller 241 may read at least part of a texture compression block(s) corresponding to texels requiring decompression from the texture cache 242 and may transmit the at least part to the decompressor 243.

The texture cache 242 may store a texture to be used in 3D graphics processing. In an embodiment, the texture cache 242 stores a texture (e.g., a texture compression block) in the form of compression. For example, the texture cache 242 may store a compressed texture. Also, the texture cache 242 may receive and store various resolutions of mipmaps for one texture from the external memory 2. The texture cache 242 may include one or more cache lines or rows each including at least one texture compression block. In response to a request of the controller 241, the texture cache 242 may provide (or output) at least part of data determined as a cache hit to the controller 241.

The decompressor 243 may decompress at least part of a texture compression block under control of the controller 241. The decompressor 243 may include a decoder (e.g., a decoder circuit) that decodes a texture compression block. In response to a request of the controller 241, the decompressor 243 may extract compression parameters to be used in a compression process from at least part of a texture compression block received from the controller 241 and may generate corresponding texel data from the extracted compression parameters. To generate texel data, the decompressor 243 may find a specific value based on the compression parameters or may obtain a specific value by performing various operations including interpolation. The decompressor 243 may decompress at least part of a texture block and may transmit decompressed texel data to the controller 241. The decompressor 243 may store at least part of the decompressed texel data in the PDC 244 under control of the controller 241.

The PDC 244 may store texel data decompressed by the decompressor 243. For example, texel data that are determined as frequently used or as having a high probability of being used again may be stored in the PDC 244 under control of the controller 241. The controller 241 may determine whether to store decompressed texel data in the PDC 244, based on requests received from the shader core 230. For example, the controller 241 may replace data present in the PDC 244 by using algorithms such as FIFO (First-In First-Out), LRU (Least Recently Used), or LFU (Least Frequently Used). The PDC 244 may provide (or output) texel data corresponding to a request of the controller 241 to the controller 241.

Under control of the controller 241, the texture merge unit 245 may merge texel data read from the PDC 244 and texel data decompressed by the decompressor 243. For example, the texture merge unit 245 may merge texels as a texel block corresponding to a request from the shader core 230. For example, a texel block includes a plurality of texels, and when first texels of a given requested texel block are located in the PDC 244 and second texels of the given requested texel block have just been decompressed by the decompressor 243, the texture merge unit 245 can combine the first texels and the second texels to generate the given requested texel block.

The texture filter 246 may filter a texel block merged by the texture merge unit 245. The texture filter 246 may obtain a color value corresponding to one pixel by mixing texel data of a texel block. For example, the texture filter 246 may filter the texel data of the texel block by performing operations such as point sampling, bilinear filtering, trilinear filtering, and anisotropic filtering. The texel data filtered by the texture filter 246 may be transmitted to the shader core 230.

Figure 5:
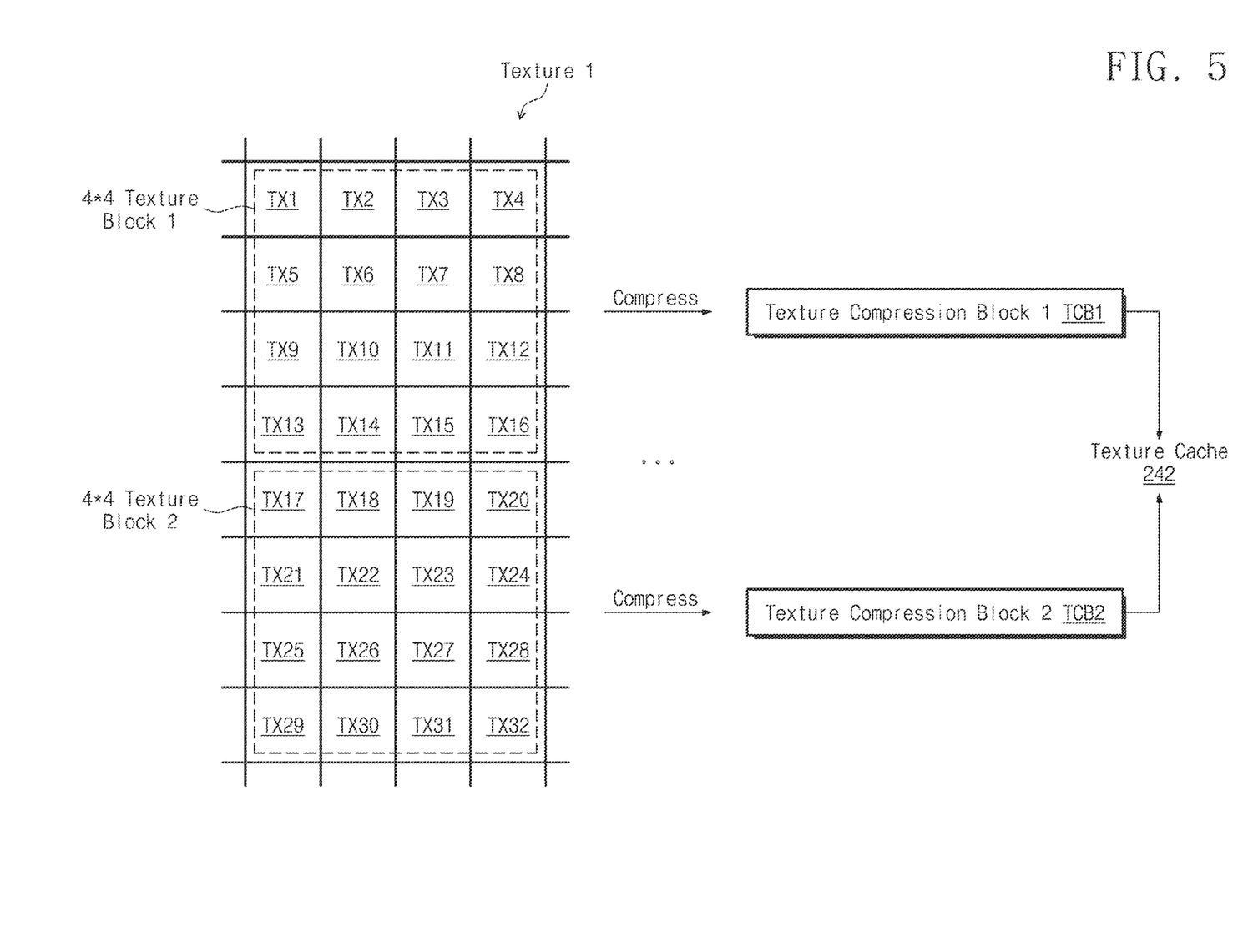
FIG. 5 illustrates a block diagram of texture compression blocks stored in a texture cache, according to an embodiment of the present disclosure.

FIG. 5 illustrates a block diagram of texture compression blocks stored in the texture cache 242, according to an embodiment of the present disclosure. One texture may include a plurality of texels and may be divided into texels of a block unit, for example, texture blocks, and each texture block may be compressed. In the embodiment illustrated in FIG. 5, a size of a texture block is illustrated as 4*4 by way of example, but the present disclosure is not limited thereto. For example, a size of a texture block may be 3*3 or 12*12.

In the embodiment illustrated in FIG. 5, a first texture includes texels TX1 to TX32. The first texture may be divided into 4*4 texture blocks each including 16 texels. For example, the first texture may include a first texture block including the texels TX1 to TX16 and a second texture block including the texels TX17 to TX32.

The first texture block and the second texture block may be compressed in compliance with various compression formats such as ASTC (Adaptive Scalable Texture Compression), 3STC (3S Texture Compression), and ETC (Ericsson Texture Compression). The first texture block may be compressed to a first texture compression block TCB1, and the second texture block may be compressed to a second texture compression block TCB2. The first texture compression block TCB1 and the second texture compression block TCB2 may be stored in the texture cache 242.

Figure 6:
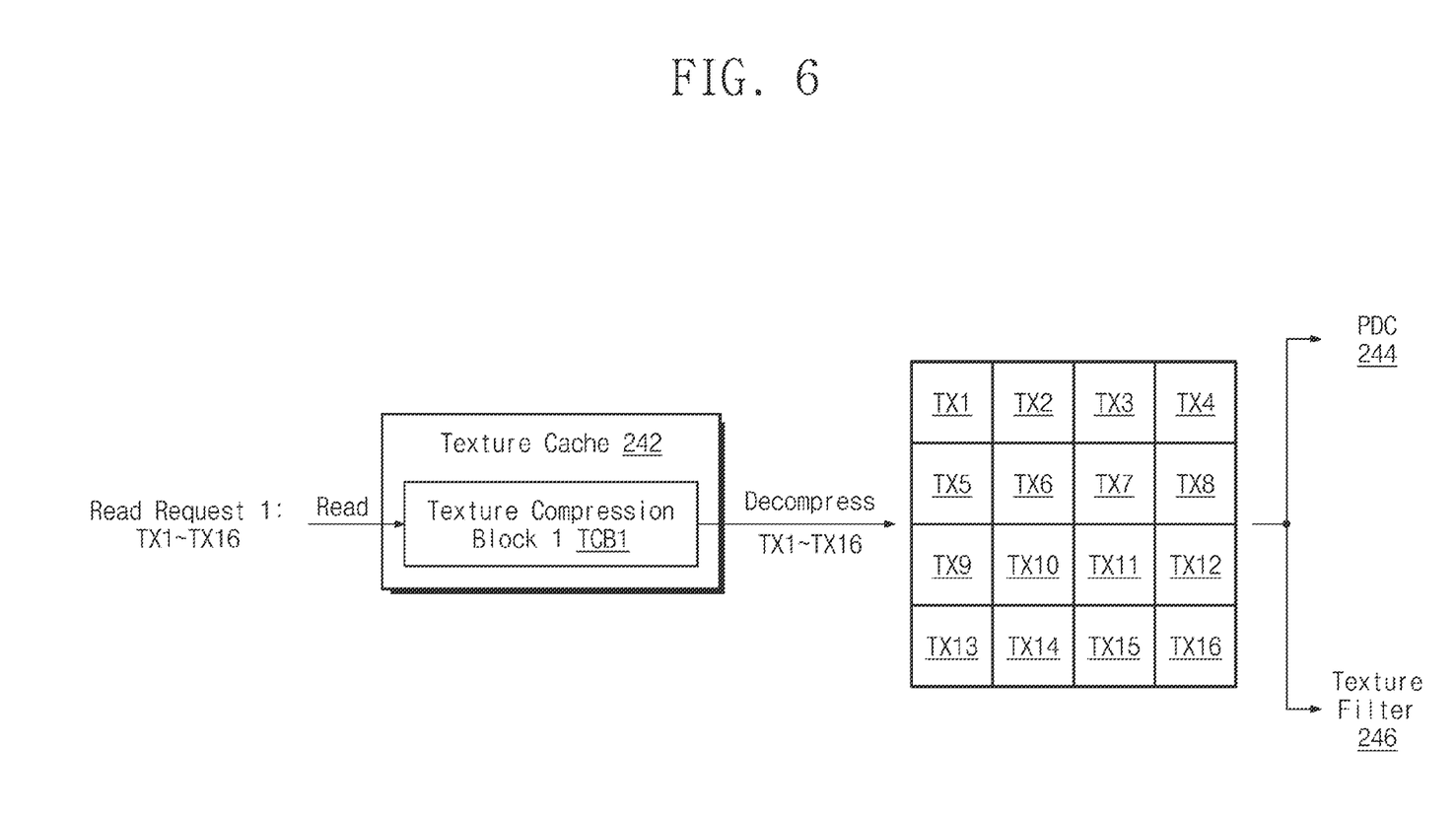
FIG. 6 illustrates an operation of a texture processing unit corresponding to a first read request, according to an embodiment of the present disclosure.

FIG. 6 illustrates an operation of a texture processing unit corresponding to a first read request, according to an embodiment of the present disclosure. Referring to FIGS. 4 to 6, the texture processing unit 240 of FIG. 4 receives a first read request for the texels TX1 to TX16 from the shader core 230. The first read request may include information indicating that the texels TX1 to TX16 correspond to the first texture block of the first texture (or a base address associated with a texture image), and coordinates of the texels TX1 to TX16 on a texture space (or the first texture). In the embodiment illustrated in FIG. 6, the texture processing unit 240 may receive a read request for 16 texels within one cycle, but embodiments of the present disclosure is not limited thereto.

In response to the first read request, the controller 241 may determine whether data of the texels TX1 to TX16 are present in the PDC 244 and may determine whether to perform decompression on any texels. When the data of the texels TX1 to TX16 are absent from the PDC 244, the controller 241 may determine that it needs to perform decompression on the texels TX1 to TX16. In the embodiment illustrated in FIG. 6, it has been assumed that the data of the texels TX1 to TX16 are absent from the PDC 244.

The controller 241 may determine whether the first texture compression block TCB1 including the texels TX1 to TX16 is present in the texture cache 242. When it is determined that the first texture compression block TCB1 including the texels TX1 to TX16 is present in the texture cache 242, the controller 241 may read the first texture compression block TCB1 from the texture cache 242 and may request decompression from the decompressor 243. Unlike the embodiment illustrated in FIG. 6, when it is determined that the first texture compression block TCB1 is absent from the texture cache 242, the controller 241 may read the first texture compression block TCB1 from the on-chip memory 210 or the external memory 2 and may request decompression from the decompressor 243.

The decompressor 243 may decompress the first texture compression block TCB1 and may generate the data of the texels TX1 to TX16. Under control of the controller 241, the decompressor 243 may store the data of the texels TX1 to TX16 in the PDC 244. Under control of the controller 241, the data of the texels TX1 to TX16 generated by the decompressor 243 may be transmitted to the texture filter 246, and the texture filter 246 may filter the data of the texels TX1 to TX16 and may provide a result of the filtering to the shader core 230.

Figure 7:
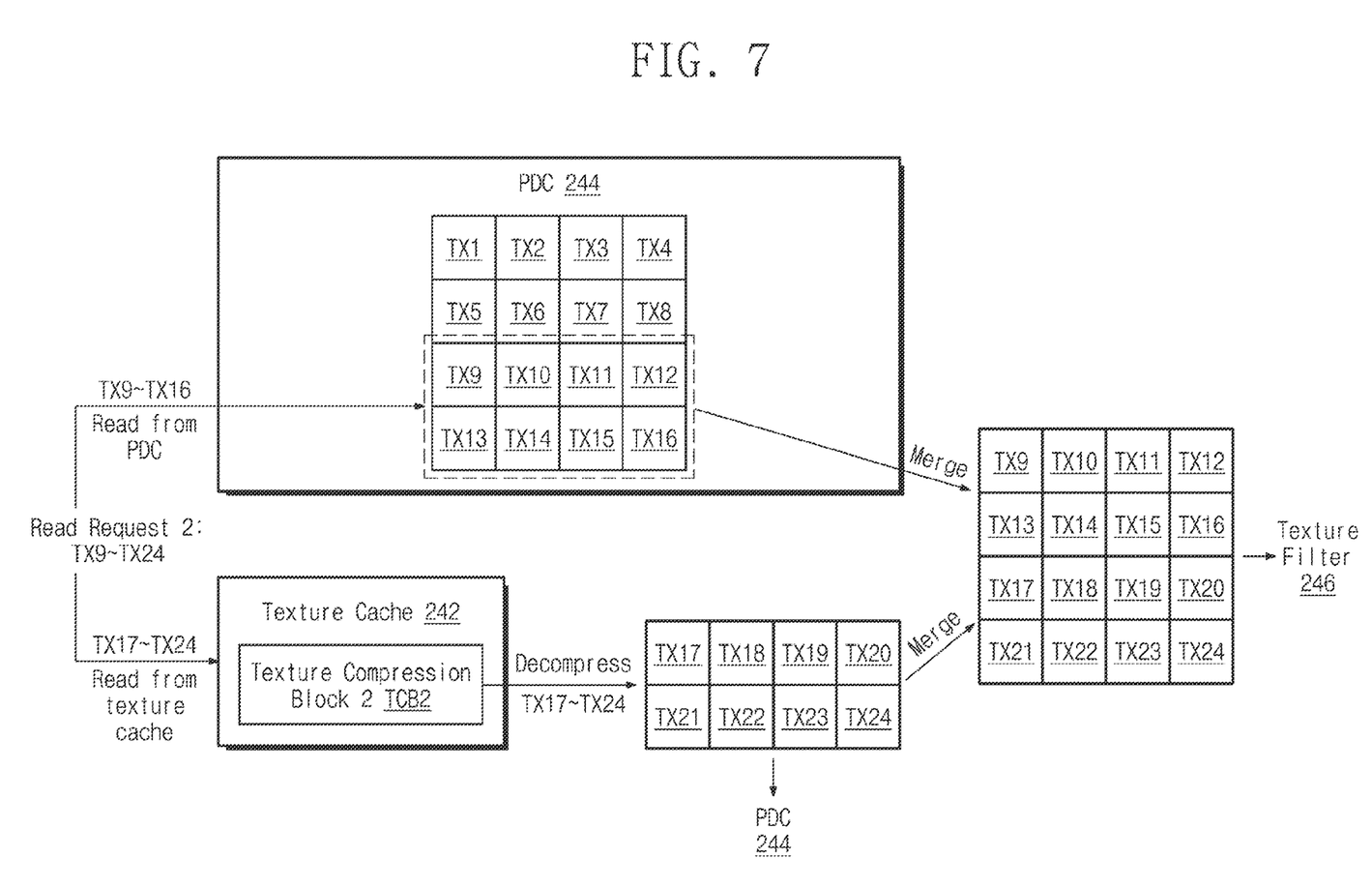
FIG. 7 illustrates an operation of a texture processing unit corresponding to a second read request, according to an embodiment of the present disclosure.

FIG. 7 illustrates an operation of a texture processing unit corresponding to a second read request, according to an embodiment of the present disclosure. Referring to FIGS. 4 to 7, the texture processing unit 240 of FIG. 4 receives a second read request for the texels TX9 to TX24 from the shader core 230. As in the first read request, the second read request may include information indicating that the texels TX9 to TX16 correspond to the first texture block of the first texture and the texels TX17 to TX24 correspond to the second texture block of the second texture, and coordinates of the texels TX9 to TX24 on a texture space.

The data of the texels TX1 to TX16 decompressed in response to the first read request may be present in one (or more) cache line of the PDC 244. For convenience of description, the texels TX1 to TX16 are illustrated as being present in the PDC 244 in the form of a block, but embodiments of the present disclosure are not limited thereto.

In response to the second read request, the controller 241 may determine whether data of the texels TX9 to TX24 are present in the PDC 244 and may determine whether to perform decompression on any texels. Because the data of the texels TX9 to TX16 are stored according to the first read request, the controller 241 does not perform decompression on the texels TX9 to TX16, the data of which are present in the PDC 244, and may determine that there is a need to perform decompression on the texels TX17 to TX24, the data of which are absent from the PDC 244.

The controller 241 may determine whether the second texture compression block TCB2 including the texels TX17 to TX24 is present in the texture cache 242. When it is determined that the second texture compression block TCB2 is present in the texture cache 242, the controller 241 may read the second texture compression block TCB2 from the texture cache 242 and may request the decompressor 243 to decompress the texels TX17 to TX24.

Under control of the controller 241, the decompressor 243 may decompress only a part of the second texture compression block TCB2 and may generate the data of the texels TX17 to TX24. In other words, the decompressor 243 may decode only a part of the second texture compression block TCB2, which corresponds to the texels TX17 to TX24, and may generate the data of the texels TX17 to TX24. Under control of the controller 241, the decompressor 243 may store the data of the texels TX17 to TX24 in the PDC 244.

Under control of the controller 241, the texture merge unit 245 may merge the data of the texels TX9 to TX16 stored (or present) in the PDC 244 and the data of the texels TX17 to TX24 generated by the decompressor 243. For example, the texture merge unit 245 may generate a 4*4 texel block by merging the data of the texels TX9 to TX16 stored (or present) in the PDC 244 and the data of the texels TX17 to TX24 generated by the decompressor 243. Under control of the controller 241, the texture filter 246 may filter a merged result of the texture filter 246 so as to be provided to the shader core 230.

In an embodiment, consecutive read requests from the shader core 230 may require duplicated texel data. For example, the shader core 230 may consecutively transmit read requests for adjacent quads to the texture processing unit 240 and texels associated with the adjacent quads may be at least partially duplicated. The texture processing unit 240 may store data, which are determined as being frequently requested or to be again used, from among the decompressed texel data in the PDC 244 in response to a request of the shader core 230. For example, the data of the texels TX1 to TX16 decompressed in response to the first read request may be stored in the PDC 244, and afterwards, a part of the stored texel data may be reused in response to the second read request following the first read request.

As texel data stored in the PDC 244 are reused, the texture processing unit 240 may decompress only at least part of one texture compression block present in the texture cache 242. For example, without decompressing the whole texture compression block corresponding to one cache line of the texture cache 242, in response to a read request of the shader core 230, the texture processing unit 240 may generate and filter appropriate texel data so as to be provided to the shader core 230. Since decompressed texel data are stored in the PDC 244, power consumption of the texture processing unit 240 due to decompression compared to the occupied area may be reduced.

Figure 8:
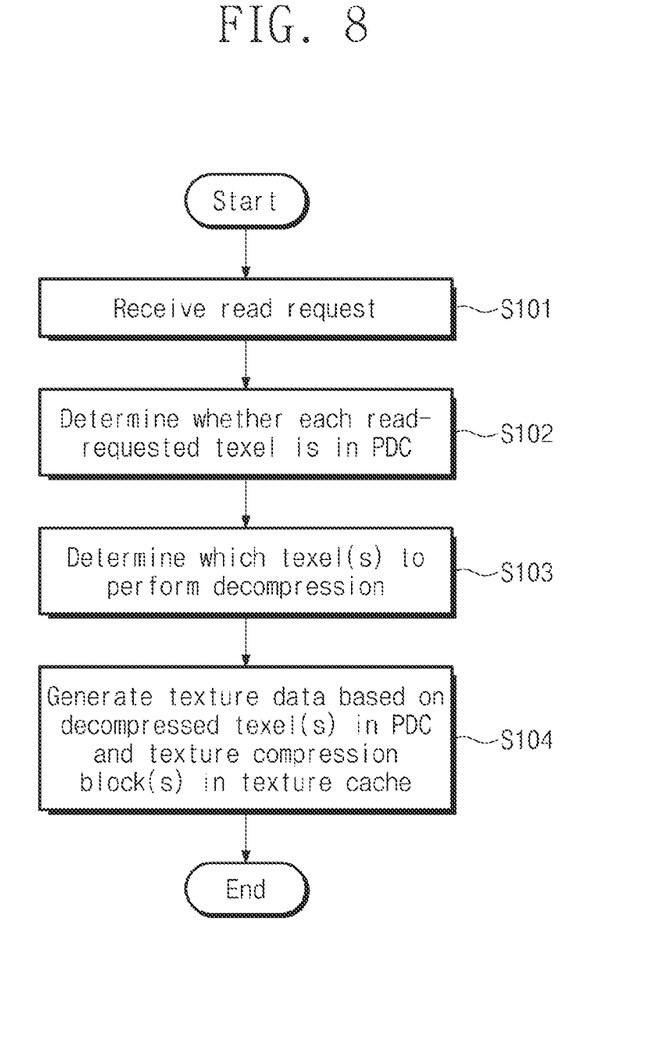
FIG. 8 is a flowchart illustrating an operating method of a texture processing unit according to an embodiment of the present disclosure.

FIG. 8 is a flowchart illustrating an operating method of the texture processing unit 240 according to an embodiment of the present disclosure. Referring to FIGS. 4 and 8, the texture processing unit 240 of FIG. 4 perform operation S101 to operation S104.

In operation S101, the texture processing unit 240 receives a read request from the shader core 230. For example, the texture processing unit 240 may receive a request for texture processing, such as the first read request of FIG. 6 or the second read request of FIG. 7, from the shader core 230.

In operation S102, the texture processing unit 240 determines whether texels (or data of the texels) requested in operation S101 are present in the PDC 244. In an embodiment, the texture processing unit 240 calculates an address corresponding to a first texel of the texels requested in operation S101 and determines whether the address corresponding to the first texel matches with an address of data previously stored in the PDC 244 to determine whether the first texel is present in the PDC 244.

In operation S103, the texture processing unit 240 determines whether to perform decompression on any texel(s), based on a determination result in operation S102. For example, the texture processing unit 240 may determine that the texels absent from the PDC 244, are targeted for decompression.

In operation S104, the texture processing unit 240 generates texture data corresponding to the read request in operation S101, based on decompressed texel data stored in the PDC 244 and texture compression block(s) stored in the texture cache 242. For example, in response to determining that decompression for a second texel of the texels requested in operation S101 is needed, the texture processing unit 240 may decompress a part associated with the second texel from a texture compression block corresponding to the second texel.

In an embodiment, the processor 120 of FIG. 1 performs operation S101 to operation S104 by executing instructions stored in the external memory 2 or the on-chip memory 110.

Figure 9:
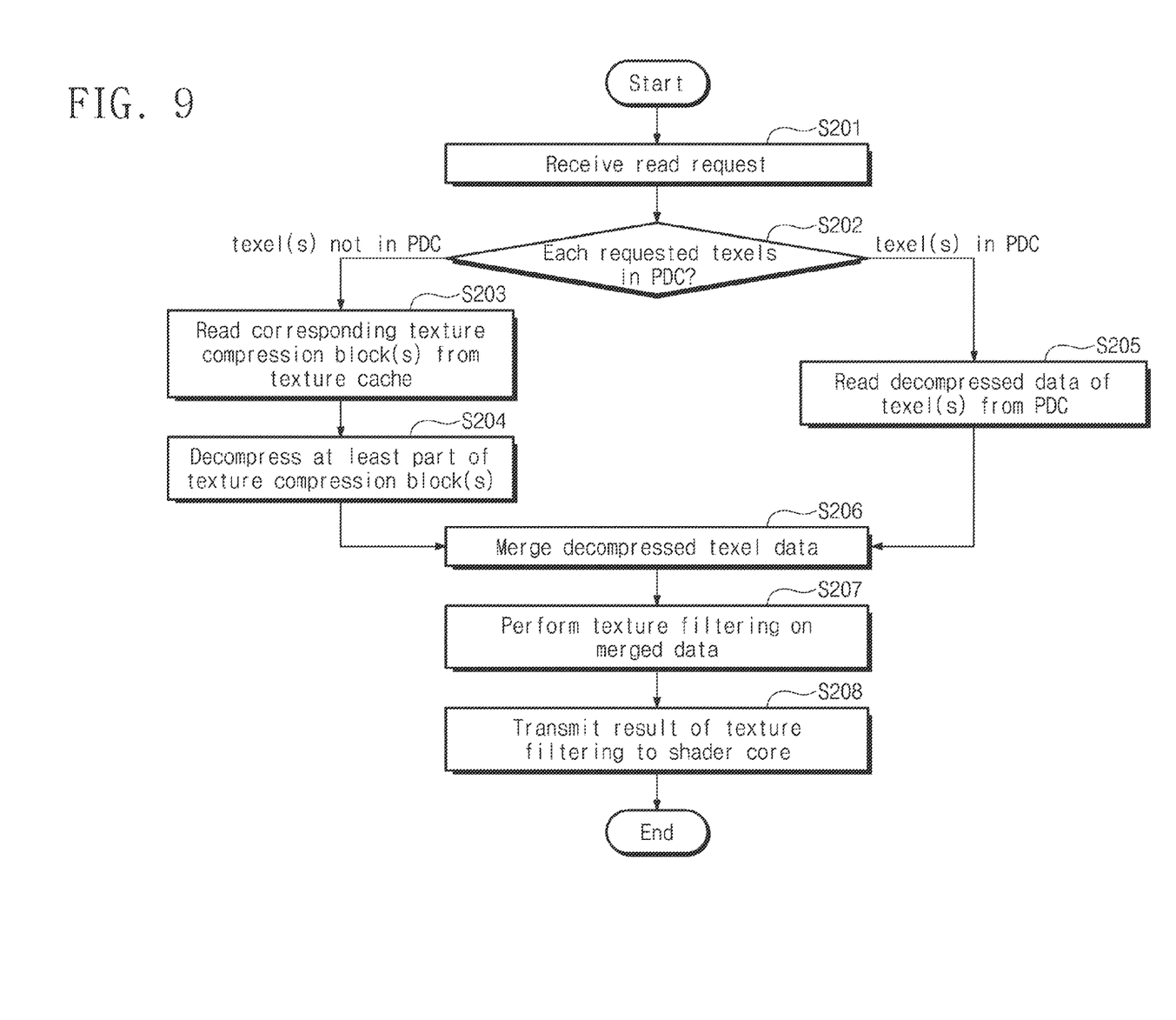
FIG. 9 is a flowchart illustrating an operating method of a texture processing unit according to an embodiment of the present disclosure.

FIG. 9 is a flowchart illustrating an operating method of the texture processing unit 240 according to an embodiment of the present disclosure. Referring to FIGS. 4 and 9, the texture processing unit 240 of FIG. 4 may perform operation S201 to operation S208.

In operation S201, the texture processing unit 240 receives a read request from the shader core 230. In operation S202, the texture processing unit 240 determines whether data of texels requested from the shader core 230 are present in the PDC 244.

The texture processing unit 240 may perform operation S203 and operation S204 on at least one texel, the data of which are absent from the PDC 244. In operation S203, the texture processing unit 240 reads a texture compression block(s) including the at least one texel from the texture cache 242. When the corresponding texture compression block(s) is absent from the texture cache 242, the texture processing unit 240 may read the corresponding texture compression block(s) from the on-chip memory 210 or the external memory 2 and may store the texture compression block thus read in the texture cache 242.

In operation S204, the texture processing unit 240 decompresses at least part of the texture compression block(s) read in operation S203. For example, the texture processing unit 240 may generate data of the at least one texel by decompressing only a part of the texture compression block(s), which corresponds to the at least one texel. In an embodiment, the texture processing unit 240 may store the data of the at least one texel thus generated in the PDC 244.

The texture processing unit 240 may perform operation S205 on the texel(s), the data of which are present in the PDC 244. In operation S205, the texture processing unit 240 reads data of a texel(s), the data of which are determined as present in the PDC 244, from the PDC 244. For example, the texture processing unit 240 may read decompressed texel data from the PDC 244.

In operation S206, the texture processing unit 240 merges the texel data decompressed in operation S204 and the decompressed texel data read in operation S205. In operation S207, the texture processing unit 240 performs texture filtering on the texel data merged in operation S206. In operation S208, the texture processing unit 240 transmits a result of operation S207, for example, a result of the texture filtering to the shader core 230.

In an embodiment, the processor 120 of FIG. 1 performs operation S201 to operation S206 by executing instructions stored in the external memory 2 or the on-chip memory 110.

A graphics processing unit according to an embodiment of the present disclosure includes a cache storing decompressed texel data and a decompressor decompressing at least part of a texture compression block (e.g., a compressed texture block). The graphics processing unit may perform decompression only on a texel, the data of which is absent in the cache. As such, power consumption of the graphics processing unit may be reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A graphics processing unit comprising:
    a first cache configured to store texture compression blocks respectively corresponding to texels;
    a second cache configured to store texel data decompressed from the first cache;
    a decompressor; and
    a controller configured to:
        receive a first read request for requested texels among the texels,
        determine which part of the requested texels correspond to compressed texel data stored in the first cache as first texels and which other part of the requested texels corresponds to partial decompressed texel data stored in the second cache as second texels,
        use the decompressor to decompress the compressed texel data of the first texels to generate partial decompressed texel data of the first texels, and
        generate first texture data based on the partial decompressed texel data of the first texels and the partial decompressed texel data of the second texels,
        wherein the partial decompressed texel data is generated by decompressing a part corresponding to the first texels from a texture compression block.

2. The graphics processing unit of claim 1, wherein the controller stores the partial decompressed texel data of the first texels in the second cache.

3. The graphics processing unit of claim 1, wherein the controller:
    calculates addresses of the requested texels in response to the first read request; and
    compares the calculated addresses with addresses of texels corresponding to decompressed texel data stored in the second cache.

4. The graphics processing unit of claim 3, wherein the controller:
    in response to determining that addresses corresponding to the second texels from among the calculated addresses are not included in the addresses of the texels corresponding to the decompressed texel data stored in the second cache, determines that decompressed texel data corresponding to the second texels are not present in the second cache; and
    in response to determining that addresses corresponding to third texels from among the calculated addresses are included in the addresses of the texels corresponding to the decompressed texel data stored in the second cache, determines that decompressed texel data corresponding to the third texels are present in the second cache.

5. The graphics processing unit of claim 1, further comprising:
    a texture merge unit; and
    wherein, under control of the controller, the texture merge unit merges the partial decompressed texel data of the first texels with the partial decompressed texel data of the second texels.

6. The graphics processing unit of claim 5, further comprising:
    a texture filter which performs texture filtering on the texel data merged by the texture merge unit, under control of the controller.

7. An operating method of a graphics processing unit, the method comprising:
    receiving a first read request for requested texels among texels;
    determining which part of the requested texels correspond to compressed texel data stored in a first cache, as first texels;
    determining which other part of the requested texels corresponds to partial decompressed texel data stored in a second cache, as second texels;
    decompressing the compressed texel data of the first texels to generate partial decompressed texel data of the first texels; and
    generating first texture data based on the partial decompressed texel data of the first texels and the partial decompressed texel data of the second texels,
    wherein the compressed texel data corresponds to a part of a texture compression block stored in the first cache.

8. The method of claim 7, wherein determining which other part of the requested texels corresponds to partial decompressed texel data stored in a second cache includes:
    calculating an address corresponding to one of the second texels; and
    comparing the calculated address with addresses corresponding to decompression data detected to be present in the second cache.

9. The method of claim 8, wherein determining which other part of the requested texels corresponds to partial decompressed texel data stored in a second cache further includes:
    in response to determining that the calculated address is included in the addresses corresponding to the decompression data detected to be present in the second cache, determining that decompression data associated with the one second texel are present in the second cache.

10. The method of claim 7, wherein the decompressing includes reading a first texture compression block from the first cache.

11. The method of claim 10, wherein the reading of the first texture compression block from the first cache comprises:
    calculating a tag corresponding to the first texture compression block;
    searching the first cache for the tag corresponding to the first texture compression block;
    in response to determining that the tag corresponding to the first texture compression block is absent from the first cache, reading the first texture compression block from an external memory and storing the first texture compression block in the first cache; and
    in response to determining that the tag corresponding to the first texture compression block is present in the first cache, reading the first texture compression block from the first cache.

12. The method of claim 7, further comprising storing the the partial decompression texel data of the first texels in the second cache.

13. The method of claim 12, further comprising:
    receiving a second read request for the first texels and third texels among the texels;

determining whether decompression data associated with the first texels and the second texels are present in the second cache;

reading the decompressed data of the first texels in response to determining that the decompressed data of the first texels are present in the second cache;

in response to determining that decompressed data of the third texels is absent from the second cache, decompressing part of a second texture compression block associated with the third texels; and generating second texture data corresponding to the second read request, based on the decompressed data of the first texels and the decompressed data of the third texels.

14. The method of claim 12, further comprising:

receiving a second read request for the first texels and third texels among the texels;

determining whether decompression data associated with the first texels and the third texels are present in the second cache;

reading the decompressed data of the first texels in response to determining that the decompressed data of the first texels and decompressed data of the third texels are present in the second cache; and generating second texture data corresponding to the second read request, based on the decompressed data of the first texels and the decompressed data of the third texels.

15. The method of claim 7, wherein the generating of the first texture data corresponding to the first read request comprises:

reading, from the second cache, the partial decompressed texel data of the second texels; and generating the first texture data by merging the partial decompressed texel data of the first texels with the partial decompressed texel data of the second texels.

16. A device comprising:

a processor; and a memory configured to store instructions executable by the processor, wherein the instructions, when executed, cause the processor to:

in response to a first request, detect whether decompression data of texels associated with the first request are present in a first cache;

decompress part of a first texture compression block associated with a first texel among the texels when a result of the detect indicates decompression data for the first texel is not present in the first cache, to generate first partial decompression data corresponding to the first texel; and generate first texture data corresponding to the first request, based on the first partial decompression data and second partial decompression data detected to be present in the first cache and corresponding to a second texel among the texels that is different from the first texel.

17. The device of claim 16, wherein the instructions, when executed, further cause the processor to:

calculate an address corresponding to the second texel of the texels; and compare the address corresponding to the second texel with addresses corresponding to decompression data present in the first cache.

18. The device of claim 17, wherein the instructions, when executed, further cause the processor to:

in response to determining that the address corresponding to the second texel is included in the addresses corresponding to the decompression data present in the first cache, determine that decompression data associated with the second texel is present in the first cache.

19. The device of claim 16, wherein the instructions, when executed, further cause the processor to store the first partial decompression data of the first texel in the first cache.

20. The device of claim 16, wherein the instructions, when executed, further cause the processor to:

read, from the first cache, decompression data associated with second texels, which are determined when the associated decompression data is present in the first cache, from among the texels; and generate the first texture data by merging the decompression data of the first texel and the decompression data associated with the second texels.

* * * * *